(12) United States Patent
Rouleau et al.

(10) Patent No.: US 11,904,927 B2
(45) Date of Patent: Feb. 20, 2024

(54) STEERING COLUMN ADJUSTMENT ASSEMBLY

(71) Applicant: Steering Solutions IP Holding Corporation, Saginaw, MI (US)

(72) Inventors: James E. Rouleau, Burt, MI (US); Shawn A. Haring, Swartz Creek, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 74 days.

(21) Appl. No.: 17/568,272

(22) Filed: Jan. 4, 2022

(65) Prior Publication Data

US 2022/0212712 A1 Jul. 7, 2022

Related U.S. Application Data

(60) Provisional application No. 63/134,437, filed on Jan. 6, 2021.

(51) Int. Cl.
| | |
|---|---|
| *B62D 1/16* | (2006.01) |
| *B62D 1/18* | (2006.01) |
| *B62D 1/181* | (2006.01) |
| *B62D 1/183* | (2006.01) |

(52) U.S. Cl.
CPC .............. *B62D 1/18* (2013.01); *B62D 1/181* (2013.01); *B62D 1/183* (2013.01)

(58) Field of Classification Search
CPC ............ G05G 1/16; G05G 1/18; G05G 1/181; G05G 1/183; G05G 1/185; B62D 1/16; B62D 1/18; B62D 1/181; B62D 1/183; B62D 1/185
See application file for complete search history.

(56) References Cited

U.S. PATENT DOCUMENTS 10,974,756 B2 * 4/2021 Cana ................ B62D 1/181

FOREIGN PATENT DOCUMENTS

| CN | 2254862 Y | * | 5/1997 | |
|---|---|---|---|---|
| FR | 2784071 A1 | * | 4/2000 | ............. B62D 5/003 |
| FR | 2891794 A1 | * | 4/2007 | ............. B62D 5/008 |
| GB | 2304865 A | * | 3/1997 | ............. B62D 1/181 |

* cited by examiner

*Primary Examiner* — Adam D Rogers
(74) *Attorney, Agent, or Firm* — Dickinson Wright PLLC

(57) ABSTRACT

A steering column includes a steering column component. The steering column also includes a driven assembly operatively coupled to the steering column component. The steering column further includes a driving assembly. The steering column yet further includes a connection assembly that includes a connection gear having a first set of teeth operatively connected to the driving assembly, the connection gear having a set of gear clutch teeth. The connection assembly also includes a clutch member operatively connected to the driven assembly, the driven assembly moving along an axis in response to actuation from the driving assembly and causes the provided axially adjustable steering column to be adjusted along the axis, the clutch member having a set of clutch member teeth. The clutch member teeth and the gear clutch teeth are disengaged in an overload state.

19 Claims, 6 Drawing Sheets

STEERING COLUMN ADJUSTMENT ASSEMBLY

CROSS-REFERENCE TO RELATED APPLICATION

This patent application claims the benefits of priority to U.S. Provisional Patent Application Ser. No. 63/134,437, filed Jan. 6, 2021, the disclosure of which is incorporated by reference herein in its entirety.

TECHNICAL FIELD

This disclosure relates to a steering assembly and, more particularly, to an adjustment assembly for an axially adjustable steering column.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for providing a steering input to an output that interacts with a steering linkage to ultimately cause the vehicle road wheels (or other intermediary elements) to turn the vehicle. Some steering columns can be movably retracted from an operational position that is close to a driver to a stowed position when manual steering control is not needed. For example, stowable steering columns that can retract deep into vehicle instrument panels can provide more space for a parked driver or for a person sitting in the driver's seat during autonomous driving.

The distance between the operational and stowed positions of the steering column can be about 150 mm. This distance is significantly greater than the telescopic range of adjustment (e.g., about 50 mm) that is available with conventional steering columns for driver comfort. Therefore, reference to a stowed position is distinguishable from axial adjustment over a range of different manual steering positions that simply accommodate different sized drivers. As autonomous functionality continues to be widely adopted, the automotive market is looking for faster actuators to stow and redeploy steering columns. These faster actuators are generally designed to move at speeds two or three times faster than the previous generation of actuators. To accomplish this speed, the actuator includes a motor that is larger and more powerful than those traditionally used. However, this performance increase does not come without concerns.

The additional requirements in motor performance increase the potential for damaging the motor and interrelated parts when the actuator is suddenly stopped at a physical limit, e.g. a retraction or extension limit. In addition, the motor shaft can be damaged when the travel is impeded during motion between its physical limits. While position sensors and motor control have preemptively reduced some risks of damage, risks are still present.

Certain protection features have been incorporated to reduce damage to the motor. Many of these protection features are mechanical, e.g. shear pins, slip clutches, belts, and tolerance rings that all provide protection from excessive torque. Many of these protection features, such as shear pins, for example, require intervention to reset, which is not desirable in an automotive application. In addition, many of these protection features include a sacrificial element like a belt or fuse (shear pin) that requires replacement once activated, which is also not desirable in the automotive industry.

Accordingly, there is a continuing desire to develop protection features that automatically reset.

SUMMARY

According to one aspect of the disclosure, an axially adjustable steering column includes a steering column component axially adjustable along a longitudinal axis of the axially adjustable steering column. The steering column also includes a driven assembly operatively coupled to the steering column component. The steering column further includes a driving assembly. The steering column yet further includes a connection assembly that includes a connection gear having a first set of teeth operatively connected to the driving assembly, the connection gear having a set of gear clutch teeth. The connection assembly also includes a clutch member operatively connected to the driven assembly, the driven assembly moving along an axis in response to actuation from the driving assembly and causes the provided axially adjustable steering column to be adjusted along the axis, the clutch member having a set of clutch member teeth. The clutch member teeth are engaged with the gear clutch teeth in a connected state to transmit torque from the driving assembly to the driven assembly. The clutch member teeth and the gear clutch teeth are disengaged in an overload state, wherein the clutch member teeth are permitted to rotate relative to the gear clutch teeth in the overload state such that the provided driving assembly does not actuate the provided driven assembly.

According to another aspect of the disclosure, an axial adjustment assembly for an axially adjustable steering column includes a driving assembly. The axial adjustment assembly also includes a driven assembly operatively coupled to a steering column component. The axial adjustment assembly further includes a connection assembly operatively connecting the driving assembly to the driven assembly to transmit a driving actuation force provided by the driving assembly to the driven assembly to axially adjust the steering column component. The connection assembly includes a connection gear driven by the driving assembly and having a set of gear clutch teeth. The connection assembly also includes a clutch member operatively coupled to the driven assembly and having a set of clutch member teeth, wherein the set of gear clutch teeth and the set of clutch member teeth are engaged in a connected state, wherein the set of gear clutch teeth and the set of clutch member teeth are disengaged in a disconnected state.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be discussed in greater detail relative to other embodiments, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for providing steering input to an output that interacts with a steering linkage to ultimately cause the vehicle wheels (or other elements) to turn the vehicle. Some steering columns can be movably retracted from an operational position that is close to a driver to a stowed position when manual steering control is not needed. For example, stowable steering columns that can retract deep into vehicle instrument panels can provide more space for a parked driver or for a person sitting in the driver's seat during autonomous driving.

The distance between the operational and stowed positions of the steering column can be about 150 mm. This distance is significantly greater than the telescopic range of adjustment (e.g., about 50 mm) that is available with conventional steering columns for driver comfort. Therefore, reference to a stowed position is distinguishable from axial adjustment over a range of different manual steering positions that simply accommodate different sized drivers. As autonomous functionality continues to be widely adopted, the automotive market is looking for faster actuators to stow and redeploy steering columns. These faster actuators are generally designed to move at speeds two or three times faster than the previous generation of actuators. To accomplish this speed, the actuator includes a motor that is larger and more powerful than those traditionally used. However, this performance increase does not come without concerns.

Accordingly, systems and methods, such as those described herein, configured to provide a resettable protection feature, may be desirable. In some embodiments, the assembly described herein may be configured to provide a protection feature to a retractable steering column.

Figure 1:
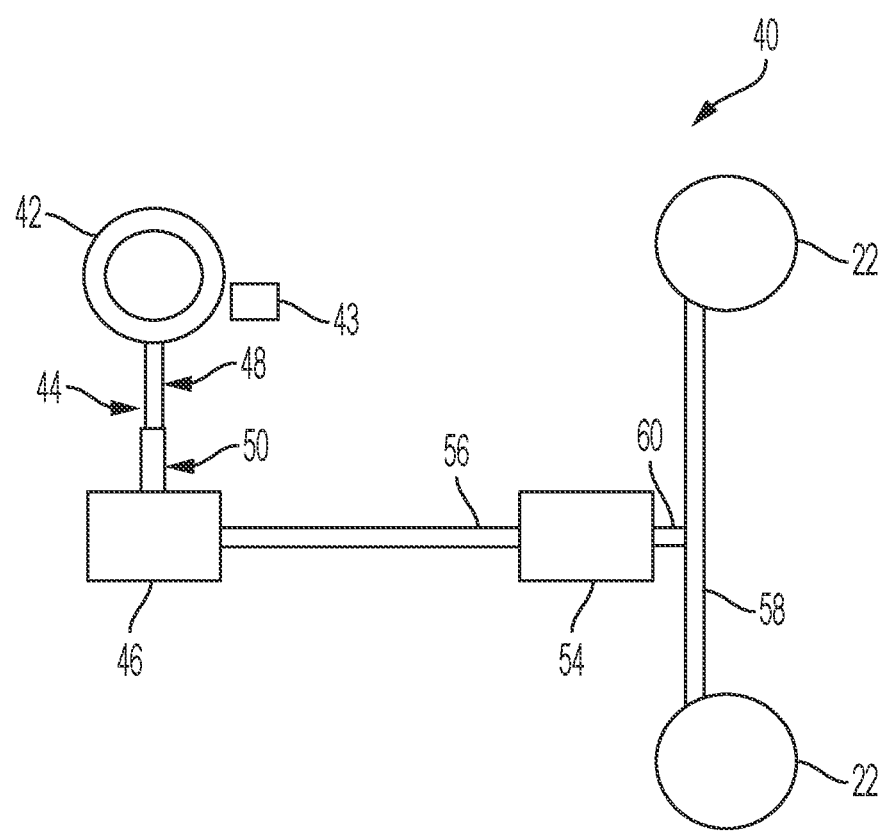
FIG. 1 schematically illustrates a steering system according to the principles of the present disclosure.

FIG. 1 generally illustrates a vehicle according to the principles of the present disclosure. As noted above, the embodiments disclosed herein may be utilized in any suitable vehicle, such as a car, a truck, a sport utility vehicle, a mini-van, a crossover, any other passenger vehicle, any suitable commercial vehicle, or any other suitable vehicle. The principles of the present disclosure may apply to other vehicles, such as planes, boats, trains, drones, or other suitable vehicles.

The vehicle includes a steering system 40. The steering system 40 may be configured as a driver interface steering system, an autonomous driving system, or a system that allows for both driver interface and autonomous steering. The steering system 40 may include an input device 42, such as a steering wheel, wherein a driver may mechanically provide a steering input by turning the steering wheel. An airbag device 43 may be located on or near the input device 42. A steering column 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column 44 may include a first portion 48 and a second portion 50 that are permitted to move axially with respect to one another. The first portion 48 and second portion 50 may be configured as jackets, shafts, brackets, rails, or other members that permit axial movement therebetween. The axial movement may include sliding, telescopic, translating, and other axial movements. The steering column 44 may include additional features that permit axial movement and brackets that provide rake and tilt movement.

The steering column 44 is moveable between a range of positions from an extended position to a retracted position e.g., stowed position. In the extended position, the end of the first portion 48 having the input device 42 attached thereto is moved axially away from the second portion 50 so that the input device 42 is located near an operator of the vehicle. In the retracted position, the end of the first portion 48 having the input device 42 attached thereto is moved axially towards the second portion 50 so that the input device 42 is located away from an operator of the vehicle. In some embodiments, the retracted position may correspond to stowing the input device 42 (i.e., stowed position). For example, it may be beneficial to place the input device 42 in a stowed position during autonomous driving. In some embodiments, the retracted position can be on the order of about 150 mm away from the extended position, such as at least 100 mm, or at least about 125 mm away from the extended position.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn the wheels 22.

Figure 2:
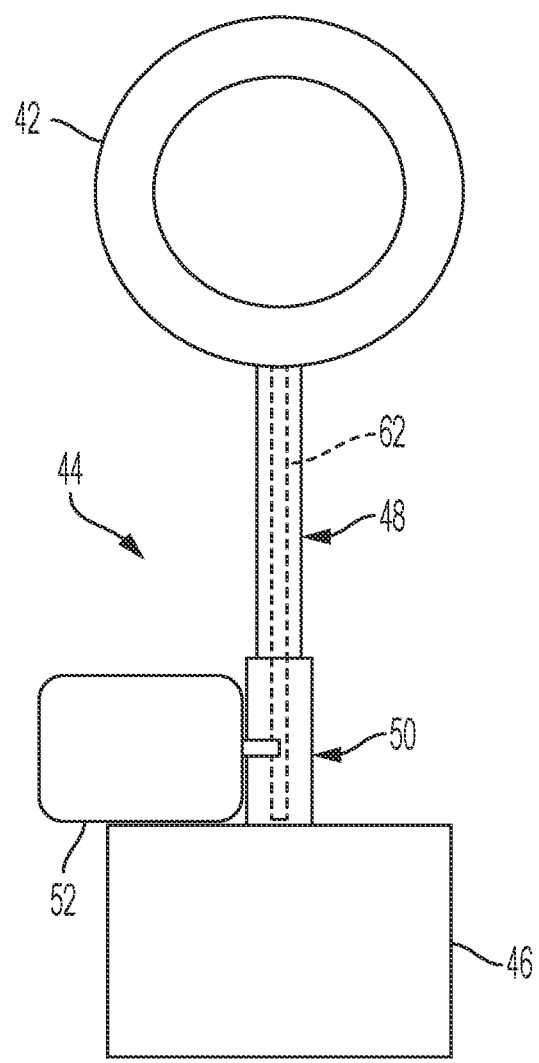
FIG. 2 schematically illustrates a steering column assembly according to the principles of the present disclosure.

FIG. 2 provides an enlarged schematic view of the steering column 44. The steering column 44 may include a steering shaft 62 located along the first portion 48 and the second portion 50. In some embodiments, the steering shaft 62 may be located within the first portion 48 and the second portion 50. The steering shaft 62 may also include more than one portion that permits axial adjustability. An adjustment assembly 52 may be located on the first portion 48, the second portion 50, the steering shaft 62, any brackets, or combinations thereof to provide steering column adjustment overload protection.

Figure 3:
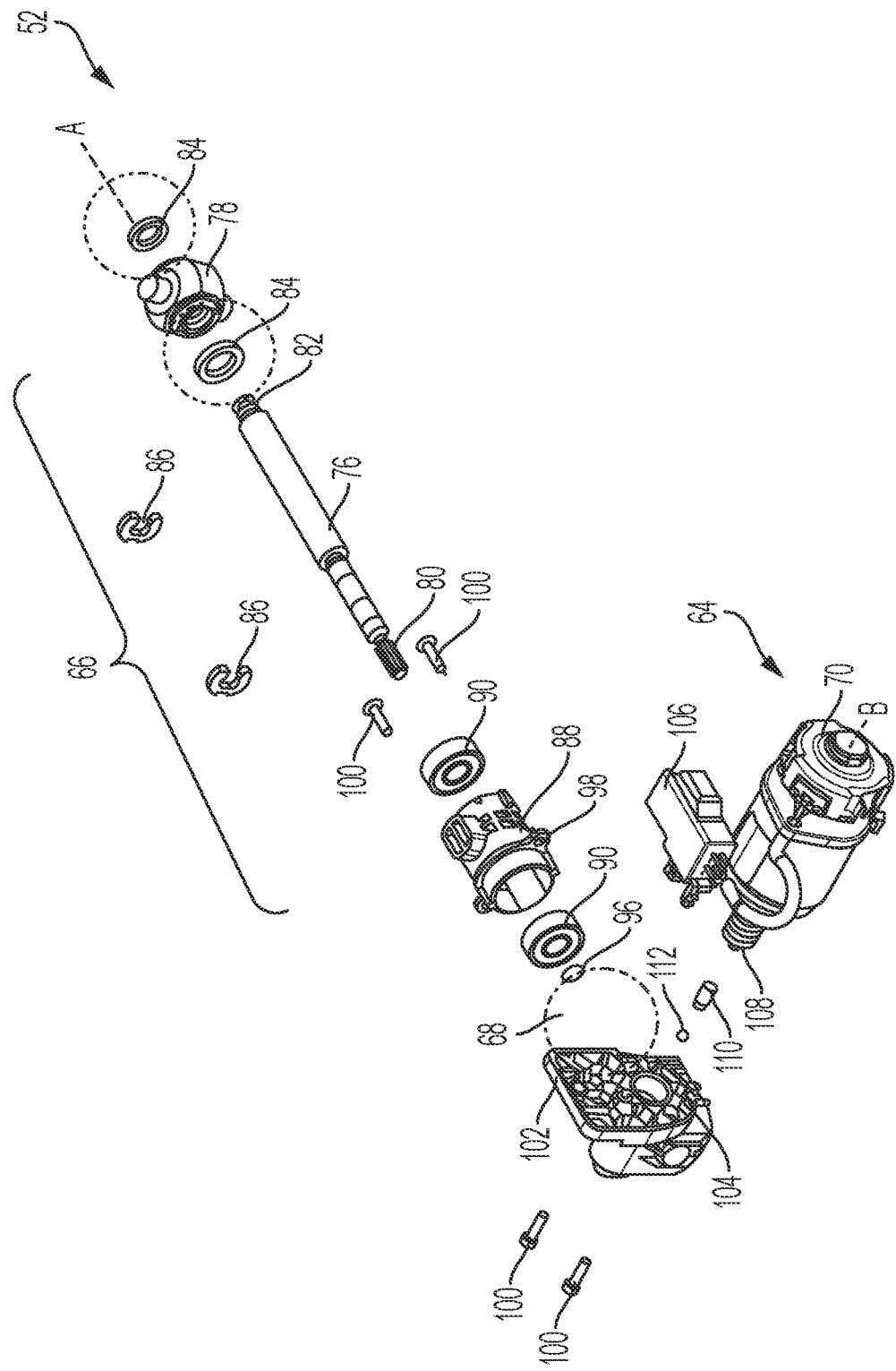
FIG. 3 is a perspective, disassembled view of an adjustment assembly according to the principles of the present disclosure.

With reference now to FIG. 3, a disassembled view of the adjustment assembly 52 is illustrated. The adjustment assembly 52 includes a driving assembly 64, a driven assembly 66, and a connection assembly 68. The driving assembly 64 may include a motor 70 that drives the driven assembly 66 resulting in the steering column 44 assembly moving between the retracted and extended positions. The connection assembly 68 connects the driving assembly 64 to the driven assembly 66 in a connected state and disconnects the driving assembly 64 from the driven assembly 66 in a disconnected state (which may be referred to as an overload state). The connection assembly 68 includes a clutch member 72 (FIG. 4) that causes the connection assembly 68 to be actuated between the connected state and the disconnected state. The connection assembly 68 may further include at least one spring element 74 (FIG. 4) that biases the connection assembly 68 in the connected state. In operation, when the steering column assembly 44 is moved to a physical limit, or impeded during movement, the biasing force of the spring element 74 is overcome such that the driving assembly 64 and the driven assembly 66 are operably disconnected and the driving assembly 64 can continue to operate without transferring damaging force to the driven assembly 66.

With continued reference to FIG. 3, the driven member 66 may include a lead screw 76 and a jack screw nut 78. The lead screw 76 extends along an axis A between a first end 80 located near the connection assembly 68 and a second end 82 located near the jack screw nut 78. The second end 82 may define exterior teeth and the jack screw nut 78 may include an internal surface defining internal teeth meshed with the exterior teeth, wherein rotation of the lead screw 76 from the driving assembly 64 causes the jack screw nut 78 to travel along the axis A. The jack screw nut 78 may be operably connected to one of the first portion 48 and the second portion 50 of the steering column assembly 44 and the lead screw 76 may be operably connected to the other of the first portion and the second portion 50. In some embodiments, one of the lead screw 76 and the jack screw nut 78 connects to one of the first portion 48 and the second portion 50 while the other of the lead screw 76 and the jack screw nut 78 connects to another portion of the steering column assembly 44 or nearby vehicle components. As such, travel of the lead screw nut 78 further causes the steering column assembly 44 to move between the extended and retracted positions.

Figure 5:
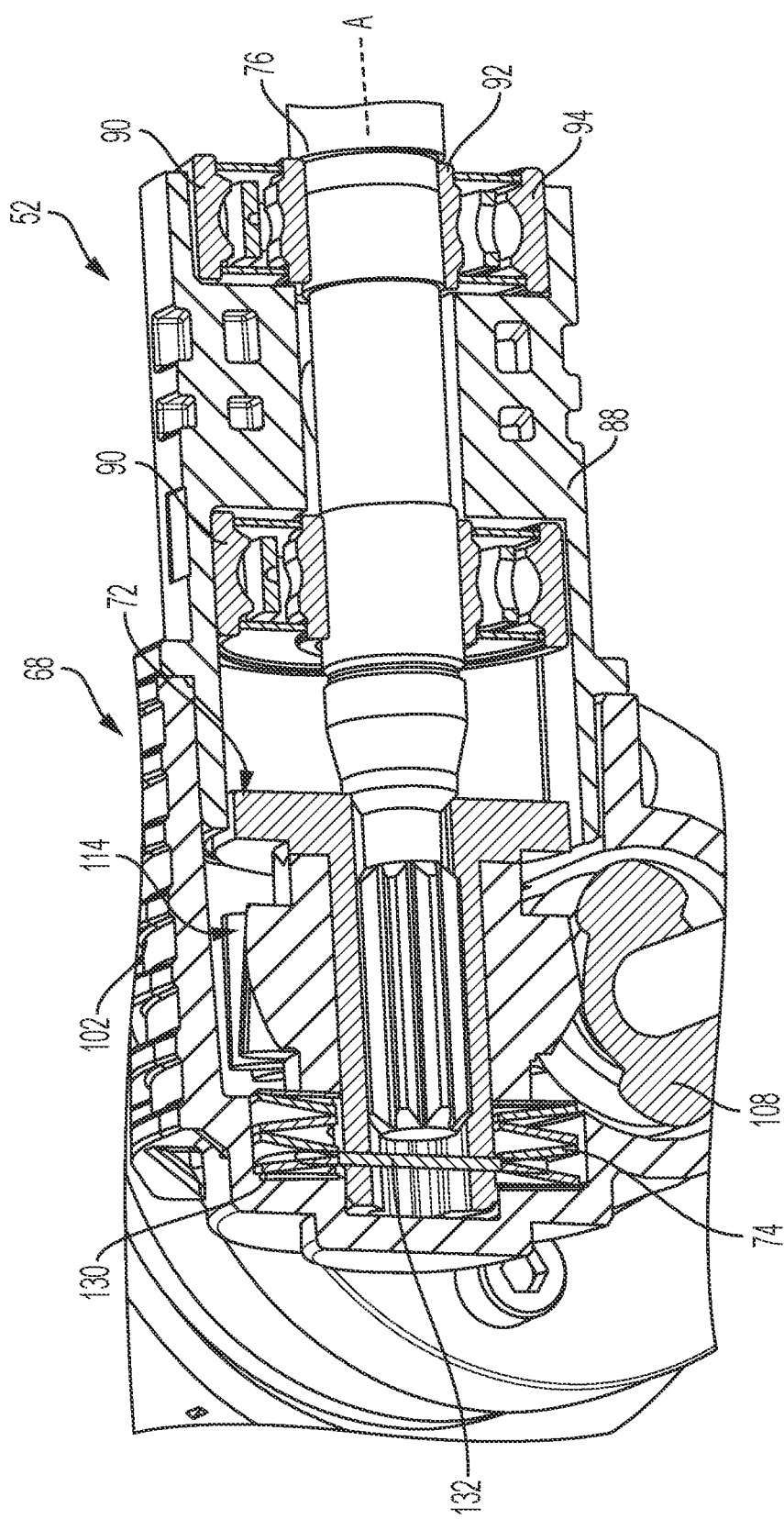
FIG. 5 is a perspective, partial cross-sectional view of the connection assembly according to the principles of the present disclosure.

In some embodiments, the lead screw 76 may be connected or otherwise integral with the steering shaft 62. The driven member 66 may further include a pair of travel stops 84, such as travel stop rings, that limit the travel distance of the jack screw nut 78 with respect to the lead screw 76. A pair of retaining clips 86 may be attached to the lead screw 76 on or near the respective ends 80, 82. In some embodiments, the lead screw 76 may be located in a lead screw housing 88 and a pair of bearing elements 90 may be located on opposite ends of the lead screw housing 88 along the axis A. As best illustrated in FIG. 5, the bearing elements 90 may be configured as ball and track bearings with an inner track 92 operably connected to the lead screw 76 and an outer track 94 operably connected to the lead screw housing 88. With reference now back to FIG. 3, at least one bearing retainer ring 96 may be located next to, and axially retain, at least one of the bearing elements 90. The lead screw housing 88 may include connection tabs 98 and a pair of fasteners 100 for connecting the lead screw housing 88 to a connection assembly housing 102. The connection assembly housing 102 may locate and protect certain features of the driving assembly 64, the driven assembly 66, the connection assembly 68, or combinations thereof. The connection assembly housing 102 further includes a driving assembly connection surface 104. The lead screw housing 88 may be located at a substantially transverse angle to the driving assembly connection surface 104. In some embodiments, the driving assembly connection surface 104 may be oriented along—or parallel to—an axis B that is substantially perpendicular to the axis A, or less in other embodiments, such as 70° or less, 50° or less, or 30° or less. Additional fasteners 100 may connect the connection assembly housing 102 to the driving assembly 64.

With continued reference to FIG. 3, the driving assembly 64 may further be connected to include a controller (not shown) through an electrical connector 106 for instructing certain operations of the driving assembly 64, e.g. to cause the steering column assembly 44 to extend or retract. The driving assembly 64 may further include a driving gear 108 that is caused to rotate, for example, by the motor 70. The driving gear 108 may be at least partially supported via a plug 110 and a cushion element 112 that further provide delashing functionality.

Figure 4:
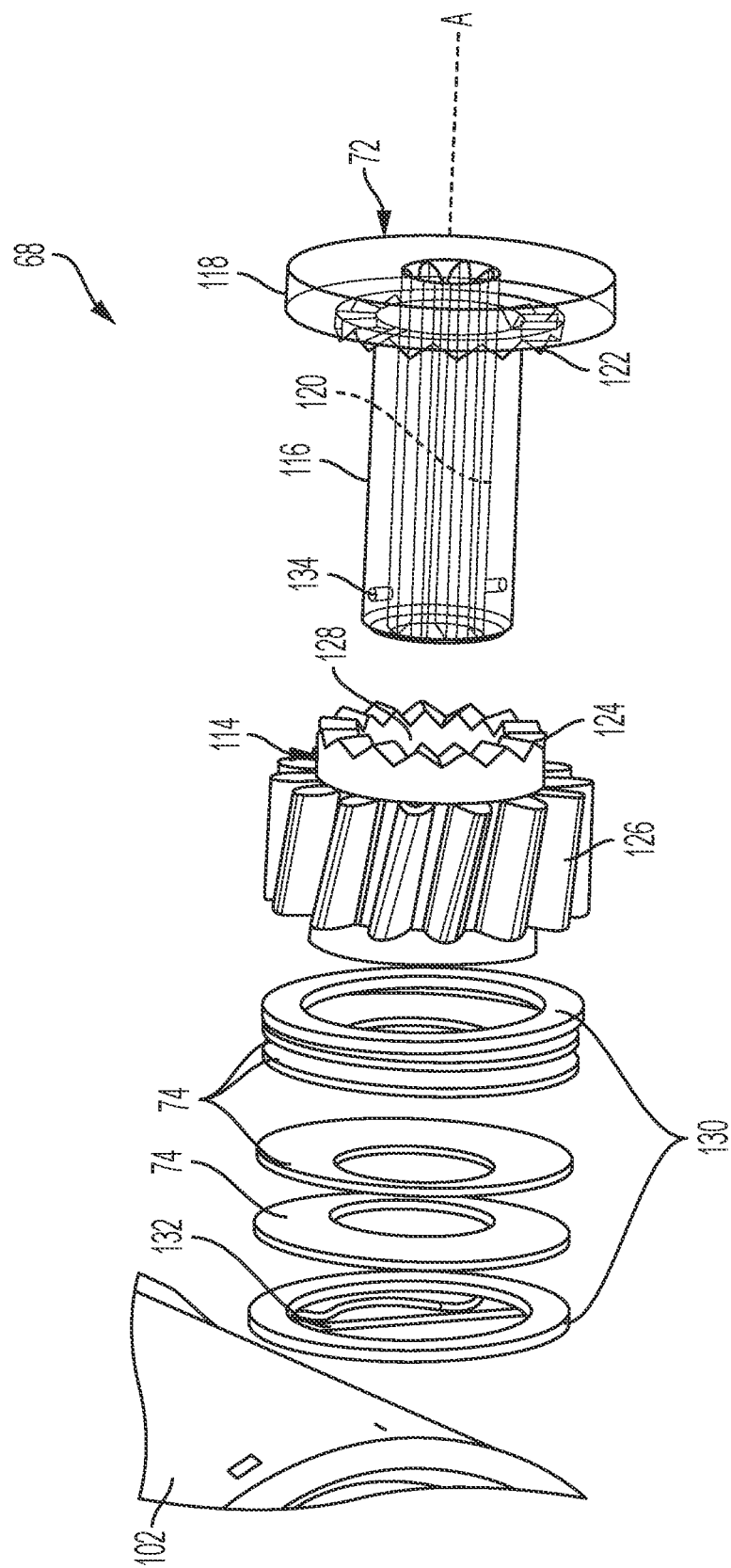
FIG. 4 is a perspective, disassembled view of a connection assembly according to the principles of the present disclosure.

A disassembled view of the connection assembly 68 is illustrated in FIG. 4. The connection assembly includes the clutch member 72, the at least one spring element 74, and a connection gear 114. In some embodiments, components of the connection assembly 68 extend along the axis A. The clutch member 72 comprises a body portion 116 and a flanged portion 118 extending radially outwardly from the body portion 116. The clutch member 72 further includes an inner wall 120 defining a series of teeth for locating the first end 80 of the lead screw 76, which may include teeth intermeshed with the teeth defined by the inner wall 120, such that the lead screw 76 and the clutch member 72 conjointly rotate. The flanged portion 118 may further include a first set of connection teeth 122 (which may be referred to herein as a first interface portion or clutch member teeth) for connection to the connection gear 114. More particularly, the connection gear 114 may include a second set of connection teeth 124 (which may be referred to herein as a second interface portion or gear clutch teeth) intermeshed or otherwise rotationally connected with the first set of connection teeth 122 when the driving assembly 64 is in the connected state and allowed to slide out of meshed engagement from the first set of connection teeth 122 when the driving assembly 64 is in the disconnected state.

With continued reference to FIG. 4, the connection gear 114 may further include driven teeth 126 intermeshed with the driving gear 108. As such, the driving gear 108 may cause the connection gear 114 to rotate and, in response, cause the second set of connection teeth 124 to drive the first set of connection teeth 122 and cause the lead screw 76 to also rotate and thus the jack screw nut 78 to travel along the axis A, when in the connected state. The connection gear 114 further includes an inner wall 128 for locating the body portion 116 of the clutch member 72. The at least one spring element 74 may include at least one washer spring located about the body portion 116 of the clutch member 72 opposite the flanged portion 118. The at least one spring element 74 may be retained between a pair of retainers 130, such as thrust washers, and the retainers 130 may be secured to the clutch member 72 via a clip 132. More particularly, the body portion 116 may include a clip retaining aperture 134 for securing the clip 132 and sandwiching the at least one spring element 74 and the retainers 130 between the clip 132 and the connection gear 114. The at least one spring element 74 therefore biases the second set of connection teeth 124 into engagement with the first set of connection teeth 122 in the connected state.

An assembled view of the connection assembly 68 is illustrated in FIG. 5. In operation, the spring elements 74 are compressed between the clip 132 and the connection gear 114 to bias the second set of connection teeth 124 into engagement with the first set of connection teeth 122 in the connected state. The connection gear 114 is driven by the motor 70 and the torque is transmitted to the clutch member 72. If the clutch member 72 cannot rotate, for example, during an overload event, the connection gear 114 can continue to rotate by sliding the first set of connection teeth 122 and the second set of connection teeth 124 past each other and further compressing the at least one spring element 74. Therefore, the connection gear 114 is permitted to rotate in its position relative to the clutch member 72 and may be limited to axial movement at the height of the first set of connection teeth 122 and the second set of connection teeth 124. The first set of connection teeth 122 and the second set of connection teeth 124 are symmetric such that the direction of rotation of the connection gear 114 will not affect the overload functionality. The symmetry may be varied if the application requires differing operational torques in the design. In some embodiments, the clutch member 72, the connection gear 114, or combinations thereof may be formed of polymeric materials (e.g., plastic, polymer, etc.) to reduce noise.

Figure 6:
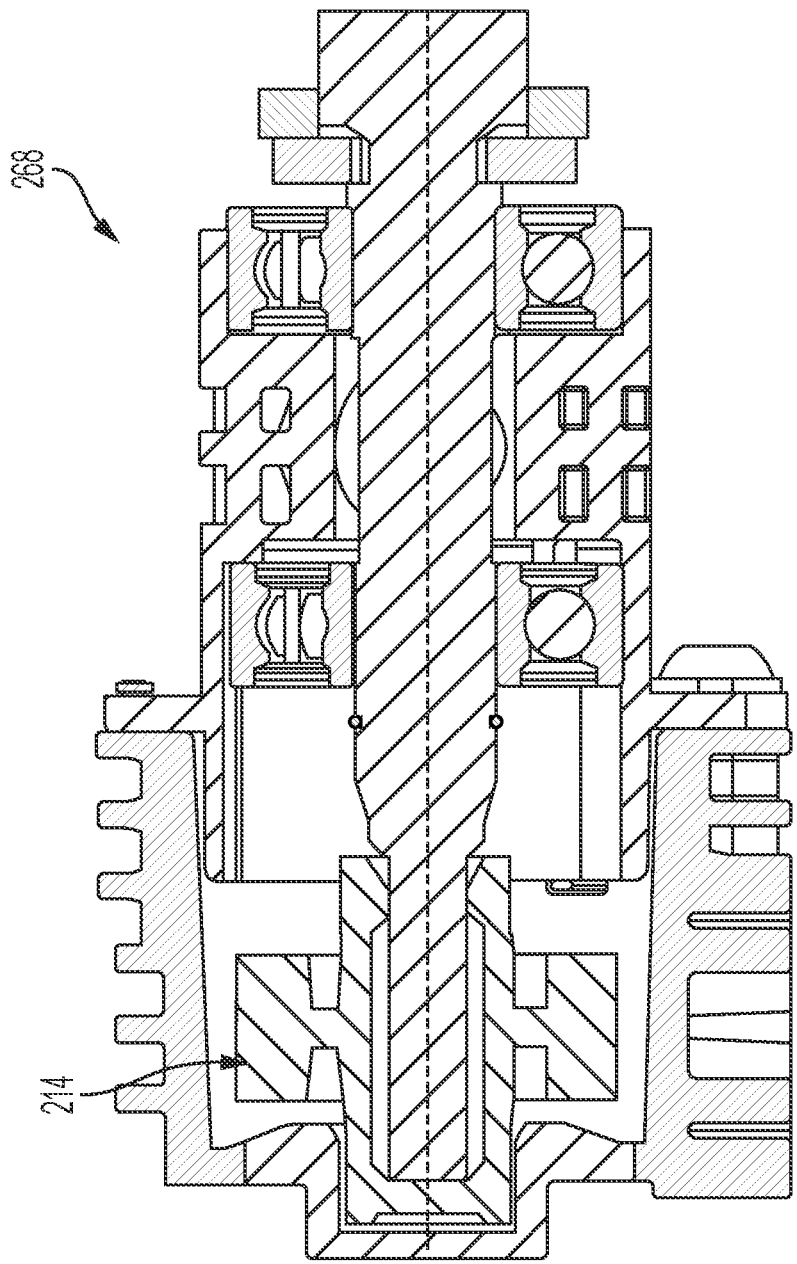
FIG. 6 is a side, elevational, partial cross-sectional view of the connection assembly according to another aspect of the disclosure.

FIG. 6 schematically illustrates a connection assembly 268 in accordance with another embodiment of the disclosure. Unless otherwise illustrated, the connection assembly 268 may share components and features of those described in reference to the connection assembly 68 described in connection with FIGS. 2-5. However, the spring element 274 may alternatively include any number of springs, such as compression springs, air springs, dampers, or combinations thereof. In addition, the clutch element 272 may include a variety of interfacing surface(s) with the connection gear 214. For example, non-toothed cam surfaces that conjointly rotate under a threshold pressure, but respectively rotate under a pressure above threshold. Similarly, the clutch member 272 may include any number of clutch arrangements, such as clutch packs that include a plurality of friction clutch plates.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. An axial adjustment assembly for an axially adjustable steering column comprising:
   a driving assembly;
   a driven assembly operatively coupled to a steering column component; and
   a connection assembly operatively connecting the driving assembly to the driven assembly to transmit a driving actuation force provided by the driving assembly to the driven assembly to axially adjust the steering column component, the connection assembly comprising:
      a connection gear driven by the driving assembly and having a set of gear clutch teeth; and
      a clutch member operatively coupled to the driven assembly and having a set of clutch member teeth, wherein the set of gear clutch teeth and the set of clutch member teeth are engaged in a connected state, wherein the set of gear clutch teeth and the set of clutch member teeth are disengaged in a disconnected state.

2. The axial adjustment assembly of claim 1, wherein at least one spring element biases the gear clutch teeth into the clutch member teeth in the connected state, and wherein a spring force provided by the at least one spring element is overcome to allow disengagement of the clutch member teeth and the gear clutch teeth.

3. The axial adjustment assembly of claim 2, wherein the at least one spring element is retained between a pair of retainers operatively coupled to the clutch member with a clip.

4. The axial adjustment assembly of claim 3, wherein the pair of retainers comprises a pair of thrust washers.

5. The axial adjustment assembly of claim 4, wherein the clutch member includes a clip retaining aperture for receiving an arm of the clip to sandwich the at least one spring element and the pair of retainers between the clip and the connection gear.

6. The axial adjustment assembly of claim 1, wherein the clutch member includes a body portion and a flanged portion, the flanged portion extending radially outwardly from the body portion, wherein the clutch member teeth are formed on a face of the flanged portion.

7. The axial adjustment assembly of claim 1, wherein the connection gear includes a set of driven teeth intermeshed with a driving gear of the driving assembly.

8. The axial adjustment assembly of claim 7, wherein the driving gear is driven by an output shaft of an electric motor in the driving assembly.

9. The axial adjustment assembly of claim 1, wherein at least one of the connection gear and the clutch member are formed of a polymeric material.

10. An axially adjustable steering column comprising:
- a steering column component axially adjustable along a longitudinal axis of the axially adjustable steering column;
- a driven assembly operatively coupled to the steering column component;
- a driving assembly;
- a connection assembly comprising:
  - a connection gear having a first set of teeth operatively connected to the driving assembly, the connection gear having a set of gear clutch teeth; and
  - a clutch member operatively connected to the driven assembly, the driven assembly moving along an axis in response to actuation from the driving assembly and causes the provided axially adjustable steering column to be adjusted along the axis, the clutch member having a set of clutch member teeth,
  - wherein the clutch member teeth are engaged with the gear clutch teeth in a connected state to transmit torque from the driving assembly to the driven assembly,
  - wherein the clutch member teeth and the gear clutch teeth are disengaged in an overload state, wherein the clutch member teeth are permitted to rotate relative to the gear clutch teeth in the overload state such that the provided driving assembly does not actuate the provided driven assembly.

11. The axially adjustable steering column of claim 10, wherein at least one spring element biases the gear clutch teeth into the clutch member teeth in the connected state, and wherein a spring force provided by the at least one spring element is overcome to allow disengagement of the clutch member teeth and the gear clutch teeth.

12. The axially adjustable steering column of claim 11, wherein the at least one spring element is retained between a pair of retainers operatively coupled to the clutch member with a clip.

13. The axially adjustable steering column of claim 12, wherein the pair of retainers comprises a pair of thrust washers.

14. The axially adjustable steering column of claim 12, wherein the clutch member includes a clip retaining aperture for receiving an arm of the clip to sandwich the at least one spring element and the pair of retainers between the clip and the connection gear.

15. The axially adjustable steering column of claim 10, wherein the clutch member includes a body portion and a flanged portion, the flanged portion extending radially outwardly from the body portion, wherein the clutch member teeth are formed on a face of the flanged portion.

16. The axially adjustable steering column of claim 10, wherein the driven assembly comprises a lead screw having lead screw teeth formed on an outer surface thereof.

17. The axially adjustable steering column of claim 16, wherein the clutch member includes an inner wall defining a central opening, the inner wall having an inner set of teeth intermeshed with the lead screw teeth.

18. The axially adjustable steering column of claim 10, wherein the driving gear is driven by an output shaft of an electric motor in the driving assembly.

19. The axially adjustable steering column of claim 10, wherein at least one of the connection gear and the clutch member are formed of a polymeric material.

\* \* \* \* \*